(12) United States Patent
Torobu et al.

(10) Patent No.: US 7,995,142 B2
(45) Date of Patent: Aug. 9, 2011

(54) SLICE LEVEL ADJUSTMENT UNIT AND EPG DATA OBTAINING DEVICE USING THE SAME

(75) Inventors: Jun Torobu, Osaka (JP); Hiroshi Hasegawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1195 days.

(21) Appl. No.: 11/712,496

(22) Filed: Mar. 1, 2007

(65) Prior Publication Data

US 2007/0209048 A1 Sep. 6, 2007

(30) Foreign Application Priority Data

Mar. 2, 2006 (JP) .................................. 2006-056348

(51) Int. Cl.
*H04N 7/00* (2006.01)
*H04N 5/18* (2006.01)
(52) U.S. Cl. ......................... 348/465; 348/689; 348/690
(58) Field of Classification Search .................. 348/465, 348/468, 689, 690; 725/38, 39, 54; *H04N 7/00, H04N 11/00, 5/18, 5/14*
See application file for complete search history.

(56) References Cited

U.S. PATENT DOCUMENTS

| 7,046,298 | B2 * | 5/2006 | Kuzumoto et al. | 348/465 |
| 7,110,041 | B2 * | 9/2006 | Matsumoto | 348/468 |
| 7,327,399 | B2 * | 2/2008 | O'Connell | 348/465 |
| 2002/0008776 | A1 * | 1/2002 | Kuzumoto et al. | 348/468 |

FOREIGN PATENT DOCUMENTS

| JP | A-08-32026 | 3/1996 |
| JP | A-08-289216 | 11/1996 |

* cited by examiner

*Primary Examiner* — Sherrie Hsia
(74) *Attorney, Agent, or Firm* — Morgan, Lewis & Bockius LLP

(57) ABSTRACT

A slice level adjustment unit for performing adjustment of a slice level with respect to a signal whose transmission is started at a predetermined time, includes a clock portion for measuring the current time, and performs a first adjustment of the slice level when the clock portion measures substantially the predetermined time and also performs a second adjustment when the clock portion measures a readjustment standby time past the predetermined time.

9 Claims, 8 Drawing Sheets

FIG.7
⟨STEP1⟩
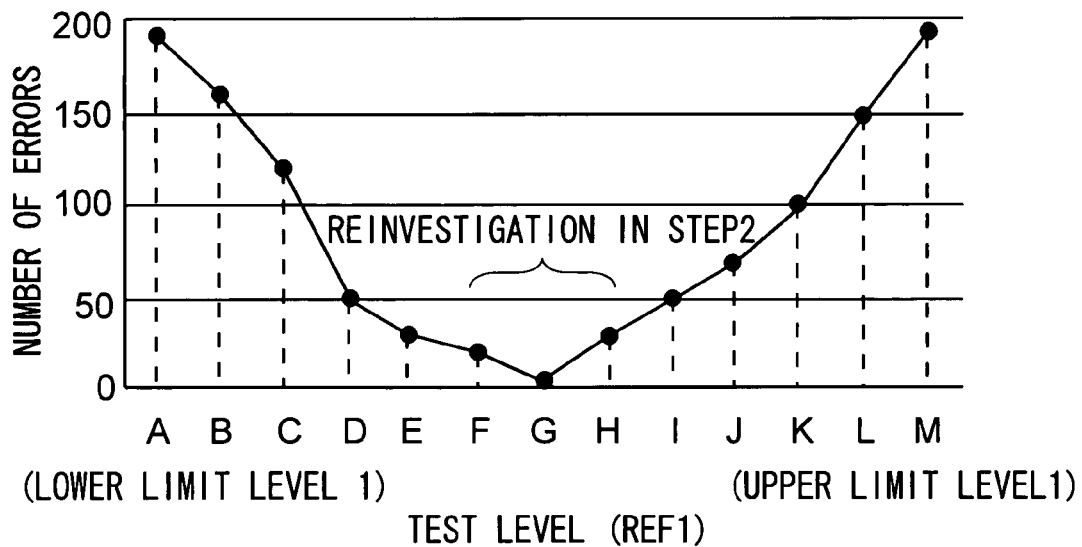
⟨STEP2⟩
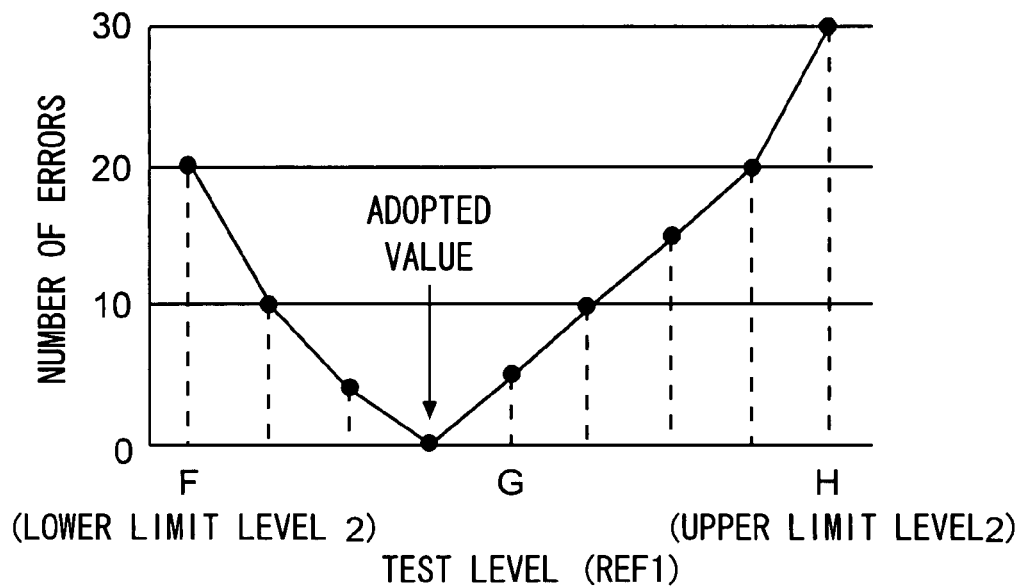

PRIOR ART

SLICE LEVEL ADJUSTMENT UNIT AND EPG DATA OBTAINING DEVICE USING THE SAME

This application is based on Japanese Patent Application No. 2006-056348 filed on Mar. 2, 2006, the contents of which are hereby incorporated by reference.

BACKGROUND OF THE INVENTION

1. Field of the Invention

The present invention relates to a slice level adjustment unit and an EPG data obtaining device using the same. In particular, the present invention relates to a slice level adjustment unit that can adjust a slice level correctly even if a ghost image or the like is generated.

2. Description of Related Art

Conventionally, delivery of electric program guide (hereinafter referred to as "EPG") data is performed utilizing a vertical blanking interval (hereinafter referred to as VBI) or the like of a TV signal. First, an example of a form of EPG data transmission will be described in brief.

EPG data of one time is transmitted by a broadcasting station from a predetermined time for a few minutes approximately a few times a day. In addition, the same EPG data is transmitted repeatedly for three times or so continuously for a purpose of compensation for a reception error or the like. FIG. 8 shows contents of a TV signal that carries the EPG data. As shown in FIG. 8, the part in which the EPG data is coded (hereinafter referred to as an "EPG signal") is positioned between a horizontal synchronization signal plus a burst signal and the next horizontal synchronization signal of the TV signal. Furthermore, transmission of the EPG data is performed in four lines (from the tenth to the thirteenth lines) in the vertical blanking interval in a field period.

In addition, the EPG signal is made up of parts of CRI (Clock Run In), FRC (Frame Code) and DATA from its head. The CRI is a part for synchronization with a bit clock, the FRC is a part concerning an identification code that is unique to each VBI standard, and the DATA is a part in which data concerning contents of EPG is coded.

Since the EPG signal is transmitted by a broadcasting station, it is a signal in which digital information described above is modulated. Therefore, a receiver side obtains the digital information one after another by comparing values of the EPG signal with a predetermined slice level using a sampling pulse, for example. Therefore, if the slice level is not set appropriately, a serious error may be generated in a stage of obtaining the digital information. In particular, if amplitude of the EPG signal fluctuates due to a noise such as a ghost image, the error is apt to occur and cause a serious problem.

In a conventional method to deal with this problem, a maximum value and a minimum value of the EPG signal during a predetermined period are detected, and an average value of them is calculated so that the slice level after that time is set to a value of the calculated result as shown in FIG. 8, for example. In addition, Japanese examined patent publication No. 08-032026 discloses a technique of adjusting the slice level as necessity so that text broadcasting data can be extracted correctly even if there is distortion in a received signal due to a noise such as a ghost image.

It is preferable that the adjustment of the slice level be performed in accordance with a state of the EPG signal that is currently received so as to correspond to a noise environment that is changing continuously, so that the slice level is adjusted to a level that is suitable for the current situation. In addition, it is preferable that the adjustment be performed as quickly as possible after starting the transmission of the EPG signal so that the EPG signal can be processed using the adjusted slice level at a stage as early as possible. Therefore, it is important to determine the timing of the adjustment.

Concerning this point, there is a method in which the adjustment of the slice level is performed constantly regardless of whether or not the EPG signal is received currently (hereinafter referred to as a "first method"). In this case, although the slice level is not adjusted appropriately during a period while the EPG signal is not received, there is no problem because the EPG signal is not coming actually. In addition, when reception of the EPG signal is started, the slice level is adjusted in accordance with a current situation automatically.

As another method, there is a method in which presence or absence of the EPG signal in the TV signal that is transmitted continuously is detected, and the adjustment of the slice level is started when coming of the EPG signal is detected (hereinafter referred to as a "second method"). In this case, amplitude of the TV signal at a position to be assigned to the EPG signal is monitored constantly. If the amplitude exceeds a constant value, it is determined that the EPG signal is received, so that the adjustment of the slice level is started.

According to the first method described above, it is not necessary to detect a time when the EPG signal comes, but the slice level is adjusted automatically when the EPG signal comes in accordance with the current situation. However, since the EPG signal is transmitted only a few times or so a day, so this method in which the slice level is adjusted constantly causes increase of an unnecessary load on a controller or the like and is very inefficient.

In addition, according to the second method described above, the load on the controller or the like can be reduced largely compared with the first method because the slice level is adjusted only when the EPG signal comes. However, according to this method, the EPG signal may not be detected correctly in a case where a certain noise is mixed into the signal. In addition, if the signal waveform when the EPG signal comes is similar to the signal waveform when the EPG signal does not come, it may be difficult to detect the coming itself of the EPG signal.

SUMMARY OF THE INVENTION

In view of the above described problems, it is an object of the present invention to provide a slice level adjustment unit that can perform adjustment of a slice level securely and as early as possible after starting transmission of a signal without detecting coming of the signal from contents of reception and with reduced control load on the adjustment process of the slice level with respect to the signal such as an EPG signal that is transmitted regularly. And it is another object of the present invention to provide an EPG data obtaining device using the slice level adjustment unit.

To attain the above described first object a slice level adjustment unit in accordance with one aspect of the present invention is a unit for performing adjustment of a slice level with respect to a signal whose transmission is started at a predetermined time, in accordance with a waveform of the signal and the unit includes a clock portion for measuring the current time. And the unit is characterized by a structure (a first structure) in which the unit performs a first adjustment of the slice level when the clock portion measures substantially the predetermined time and performs a second adjustment when the clock portion measures a readjustment standby time past the predetermined time.

If the adjustment of the slice level is performed at the timing when the clock portion measures the predetermined time, it is not necessary to detect coming of the EPG signal or the like from contents of reception, so that the adjustment can be performed quickly in response to coming of the signal. Therefore, the adjustment of the slice level can be performed at an early stage after starting of the transmission of the signal. In addition, if the adjustment of the slice level is performed at a predetermined and limited timing, it is not necessary to perform the adjustment at other timings, so that a control load on the adjustment process can be reduced as much as possible.

However, if the adjustment of the slice level is performed simply at the time when the clock portion measures the predetermined time, there will be a problem that the adjustment may not be performed correctly in a case where a measurement error is generated in the clock portion. For example, if the clock portion measures the predetermined time by mistake before the signal that is a target of the adjustment of the slice level is actually transmitted (i.e., before the predetermined time), the adjustment is performed in a state where the signal does not exist.

Therefore, in this first structure, the adjustment of the slice level is performed again (the second adjustment) when a readjustment standby time has passed after the predetermined time, so that the problem described above can be solved. For example, if a measurement error range of the clock portion is ±60 seconds a month and if time adjustment is performed once a month, the measurement error of the clock portion is expected to be within a range of 60 seconds at most. In this case, therefore, it is preferable to perform the adjustment of the slice level again when detecting at least 60 seconds after the predetermined time.

As described above, according to this structure, the first adjustment enables the adjustment of the slice level at an early stage in a reception period of a signal that is a target of the adjustment, while the second adjustment ensures the adjustment of the slice level in a situation where the signal is actually received even if a measurement error is generated in time.

It is preferable in the structure above that the unit has a structure (a second structure) in which the first adjustment and/or the second adjustment include a first process for selecting an optimal level as the slice level from a group of first levels that are obtained by dividing a range between an upper limit level predetermined as an upper limit of the slice level and a lower limit level predetermined as a lower limit by a predetermined number, and a second process for selecting an optimal level as the slice level from a group of second levels that are obtained by further dividing a range between levels neighboring the selected level by the first process among the group of first levels by a predetermined number.

According to this second structure, first an optimal level as the slice level is roughly selected from the range between the upper limit level and the lower limit level of the slice level by the first process. Then, by the second process, the optimal level as the slice level is finely selected from the vicinity of the level selected by the first process. Therefore, searching of an optimal level as the slice level can be performed precisely and efficiently.

Furthermore, in the first or the second structure described above, the first adjustment may have a structure (a third structure) including a third process for detecting a maximum value and a minimum value of the signal during a predetermined period, and for deciding whether or not an average value of them is allowable to be the slice level.

According to this third structure, if a level that is allowable to be the slice level is obtained by the predetermined third process, it is possible to adopt the level as the slice level. Since the third process only detects the average value of the maximum value and the minimum value of the signal, a quick adjustment process with reduced load on a controller can be realized. At this point, even the simple process like the third process can search an appropriate slice level if distortion of the signal waveform is small.

Furthermore, in a case where a level that is allowable to be the slice level is not obtained by the third process, i.e., in a case where considerable distortion is generated in the signal waveform by a noise, it is better to perform another adjustment of the slice level with high precision. In this way, according to this structure, it is possible to realize the adjustment process of an appropriate slice level considering a balance between a process load and process accuracy in accordance with noise environment or the like.

Furthermore, in any one of the first to the third structures described above, the second adjustment may have a structure (a fourth structure) including a fourth process for deciding whether or not the slice level adopted in the first adjustment is allowable to be the slice level.

According to this fourth structure, if the level is allowable to be the slice level in the fourth process, the slice level adopted in the first adjustment can be adopted as the slice level successively from then on. Therefore, it is unnecessary to search a new appropriate slice level, so the process load is reduced.

In addition, if the level is decided to be not allowable to be the slice level in the fourth process, it is better to perform another adjustment of the slice level with high precision. In this way, according to this structure, it is possible to realize the adjustment process of an appropriate slice level considering a balance between process load and process accuracy in accordance with whether or not the first adjustment was performed appropriately.

To attain the above described first object also, a slice level adjustment unit in accordance with another aspect of the present invention is a unit for performing adjustment of a slice level with respect to an EPG signal whose transmission is started at a predetermined time, in accordance with a waveform of the signal, and the unit includes a clock portion for measuring the current time. And the unit is characterized by a structure (a sixth structure) in which the unit performs a first adjustment of the slice level when the clock portion measures substantially the predetermined time and performs a second adjustment when the clock portion measures a readjustment standby time past the predetermined time, in the first adjustment, a third process is performed for detecting a maximum value and a minimum value of the signal during a predetermined period, and for deciding whether or not an average value of them is allowable to be the slice level, if it is decided that the average value is allowable to be the slice level in the third process, the average value is adopted as the slice level, if it is decided that the average value is not allowable to be the slice level in the third process, a first process for selecting an optimal level as the slice level from a group of first levels that are obtained by dividing a range between an upper limit level predetermined as an upper limit of the slice level and a lower limit level predetermined as a lower limit by a predetermined number, and a second process for selecting an optimal level as the slice level from a group of second levels that are obtained by further dividing a range between levels neighboring the selected level by the first process among the group of first levels by a predetermined number are performed so that the level selected in the second process is adopted as the slice level, in the second adjustment, a fourth process for deciding whether or not the slice level adopted in the first adjustment is allowable to be the slice level is performed, if it is decided that the slice level adopted in the first adjustment is allowable to be the slice level in the fourth process, the slice level adopted in the first adjustment is maintained as the slice level successively, and if it is decided that the slice level adopted in the first adjustment is not allowable to be the slice level in the fourth process, the first process and the second process are performed so that the level selected in the second process is adopted as the slice level.

According to the sixth structure described above, adjustment of the slice level with respect to the EPG signal can be performed while taking all the advantages in the first to the fifth structures described above.

In addition, an EPG data obtaining device may have a structure (a fifth structure) including a slice level adjustment unit according to any one of the first structure described above and the second to the fourth structure described above for adjusting the slice level with respect to the EPG signal, and a data obtaining portion for obtaining EPG data from the EPG signal based on the slice level obtained by the slice level adjustment unit. According to this fifth structure, it is possible to obtain EPG data while taking the advantage in any one of the first to the fifth structures.

According to the slice level adjustment unit of the present invention, since the adjustment of the slice level (the first adjustment) is performed at the timing when the clock portion measures a predetermined time, it is not necessary to detect coming of the EPG signal or the like from contents of reception, so that the adjustment can be quickly in response to coming of the signal. Therefore, the adjustment of the slice level can be performed at an early stage after starting of the transmission of the signal. In addition, since the adjustment of the slice level is performed at a predetermined and limited timing, it is not necessary to perform the adjustment at other timings, so that a control load on the adjustment process can be reduced as much as possible.

Furthermore, since the adjustment of the slice level is performed again (the second adjustment) when a readjustment standby time has passed after the predetermined time, appropriate adjustment of the slice level can be performed securely (in the situation where the signal is actually received) even in a case where the first adjustment was not performed appropriately because of a measurement error in the clock portion or the like.

BRIEF DESCRIPTION OF THE DRAWINGS

FIG. 7 is an explanatory diagram concerning the process of STEP1 and STEP2.

DETAILED DESCRIPTION OF THE PREFERRED EMBODIMENTS

Figure 1:
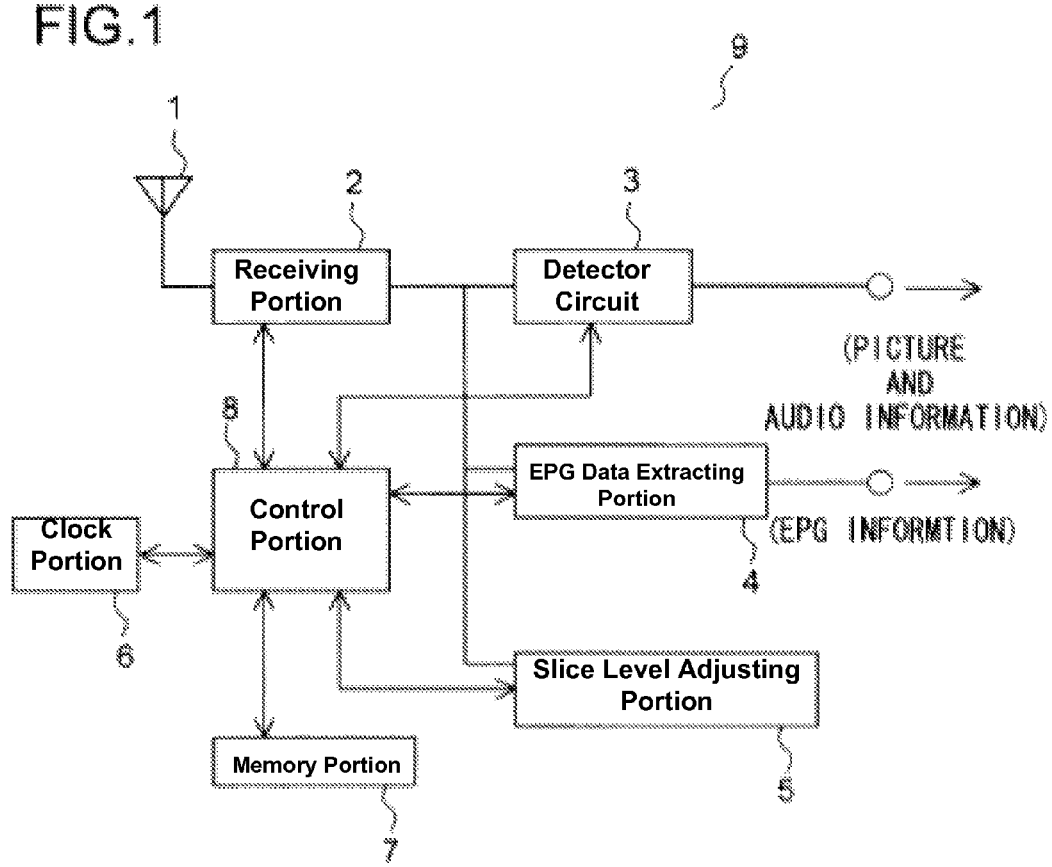
FIG. 1 is a schematic diagram to show an EPG data obtaining device according to an embodiment of the present invention.

Now, a TV receiver that is an embodiment of the present invention will be described in detail with reference to the attached drawings. FIG. 1 is a schematic diagram to show a structure of an EPG data obtaining device according to the present invention. As shown in FIG. 1, this device is made up of an antenna 1, a receiving portion 2, a detector circuit 3, an EPG data extracting portion 4, a slice level adjusting portion 5, a clock portion 6, a memory portion 7, a control portion 8 and the like.

A TV signal received by the antenna 1 is sent to the receiving portion 2. The receiving portion 2 includes a tuner circuit or the like for selecting a signal of a desired frequency, which performs a predetermined process on a received signal and supplies the signal to a subsequent circuit.

The detector circuit 3 extracts a picture signal and an audio signal from the supplied signal and supplies the extracted signals to a subsequent circuit. Then, the subsequent circuit produces pictures and sounds in accordance with these signals.

The EPG data extracting portion 4 extracts EPG information from the supplied signal and supplies it to a subsequent circuit. More specifically, it compares an EPG signal included in the input signal with a slice level that is determined by the slice level adjusting portion 5 in synchronization with timings indicated by a predetermined sampling pulse. Then it extracts digital data concerning the EPG in accordance with the comparison result between them. At this point, the subsequent circuit provides the EPG information to a user based on the extracted EPG data.

The slice level adjusting portion 5 adjusts the slice level that is used by the EPG data extracting portion 4 to an appropriate level. Concrete contents of the adjustment method will be described later in detail.

The clock portion 6 continuously measures the current time by using a quartz oscillator and a frequency divider circuit, for example. The current time information is used for detecting a timing to start a series of adjustment of the slice level. In addition, the current time information may be used for notifying a user of time via a display portion.

The memory portion 7 stores a time when the EPG signal is transmitted from the broadcasting station (EPG transmission time) and various information that is used for the adjustment process of the slice level or the like (such as values of levels used in the processes of STEP1 and STEP2 that will be described later).

The control portion 8 controls operations of portions inside the TV receiver. In particular, if it detects coming of the time when the adjustment of the slice level should be performed via the clock portion 6, it performs the adjustment process of the slice level that will be described later via the slice level adjusting portion 5.

Figure 2:
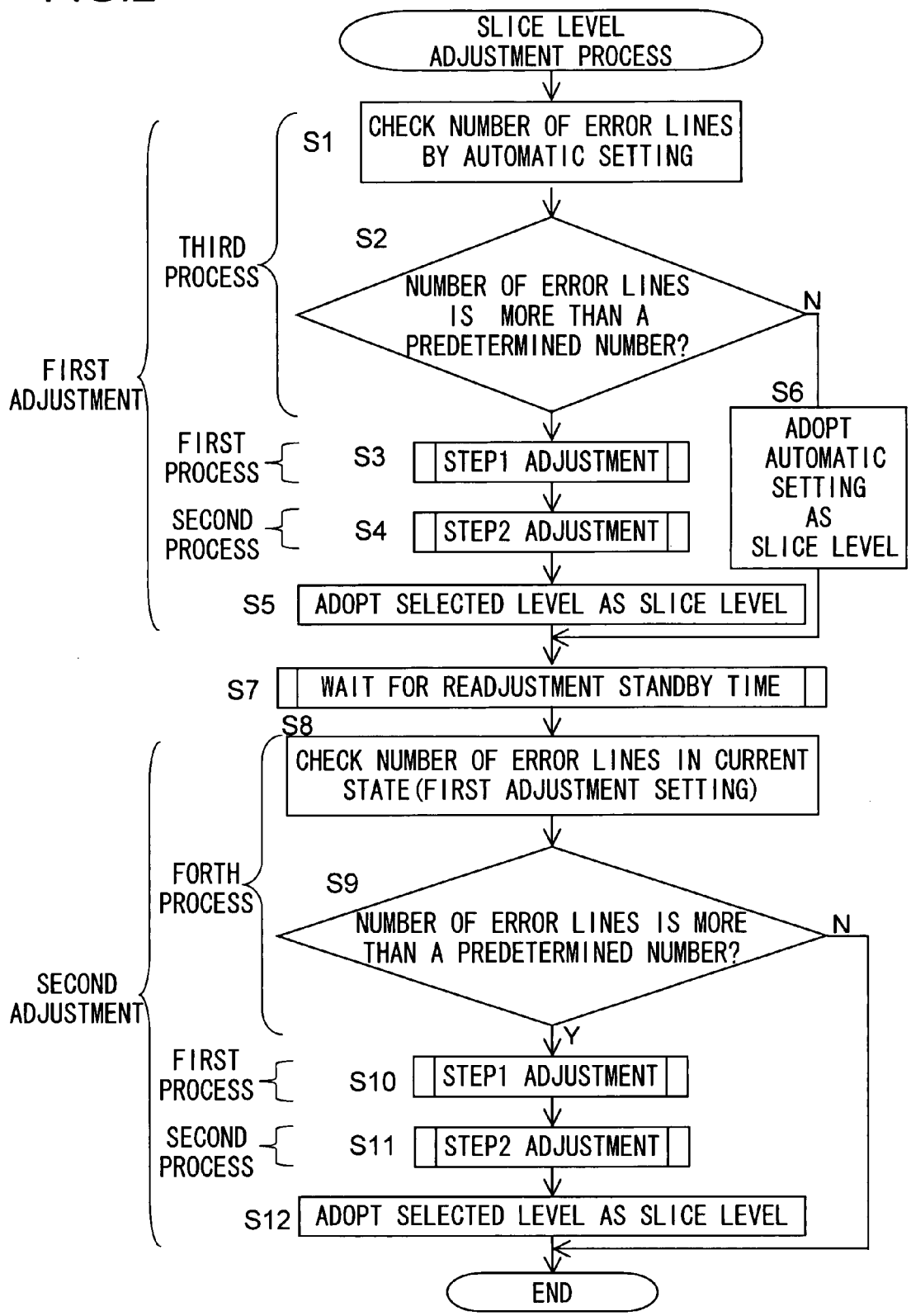
FIG. 2 is a general flowchart to show adjustment of a slice level in the embodiment of the present invention.
Figure 3:
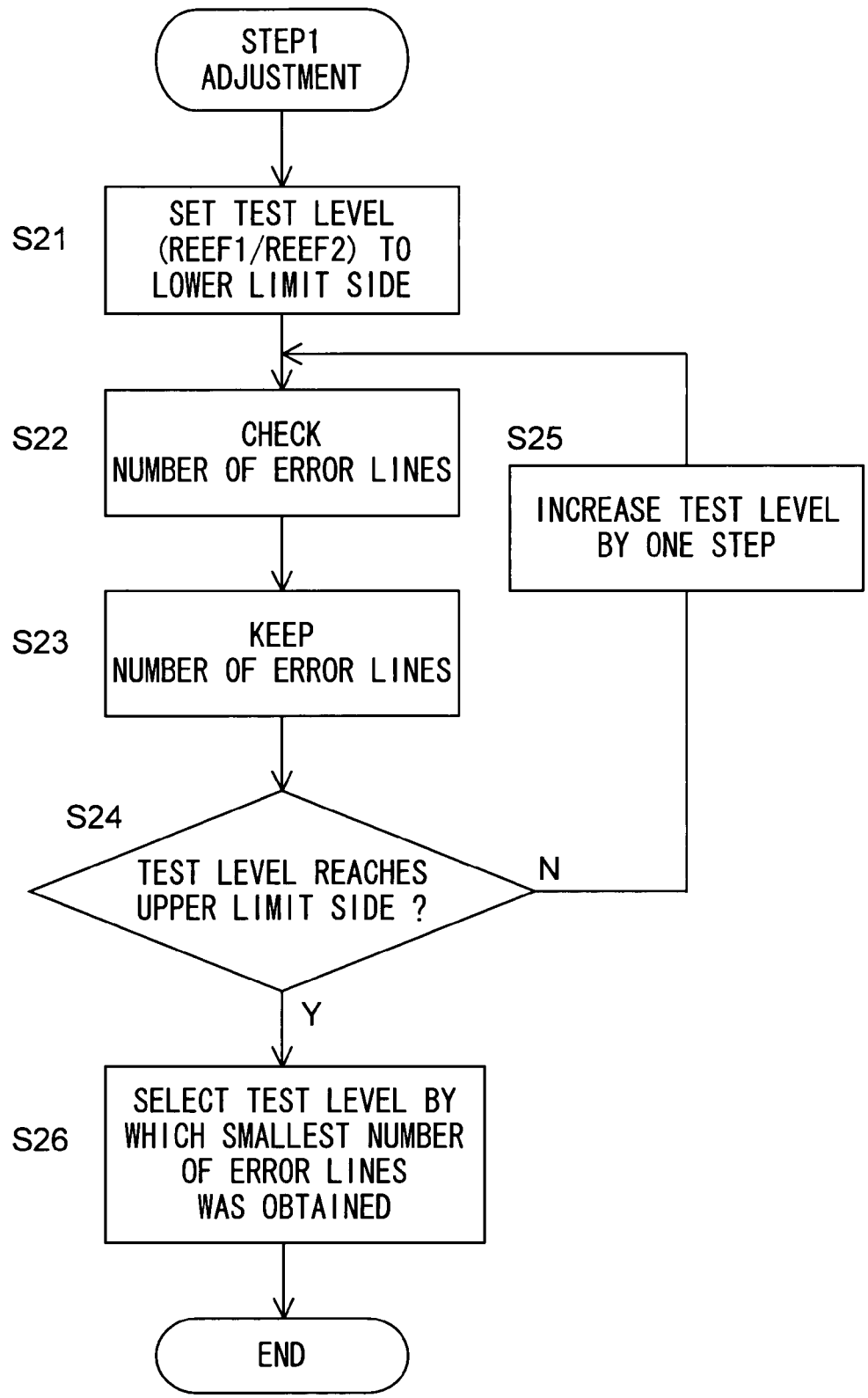
FIG. 3 is a flowchart concerning a process of STEP1 in the embodiment of the present invention.
Figure 4:
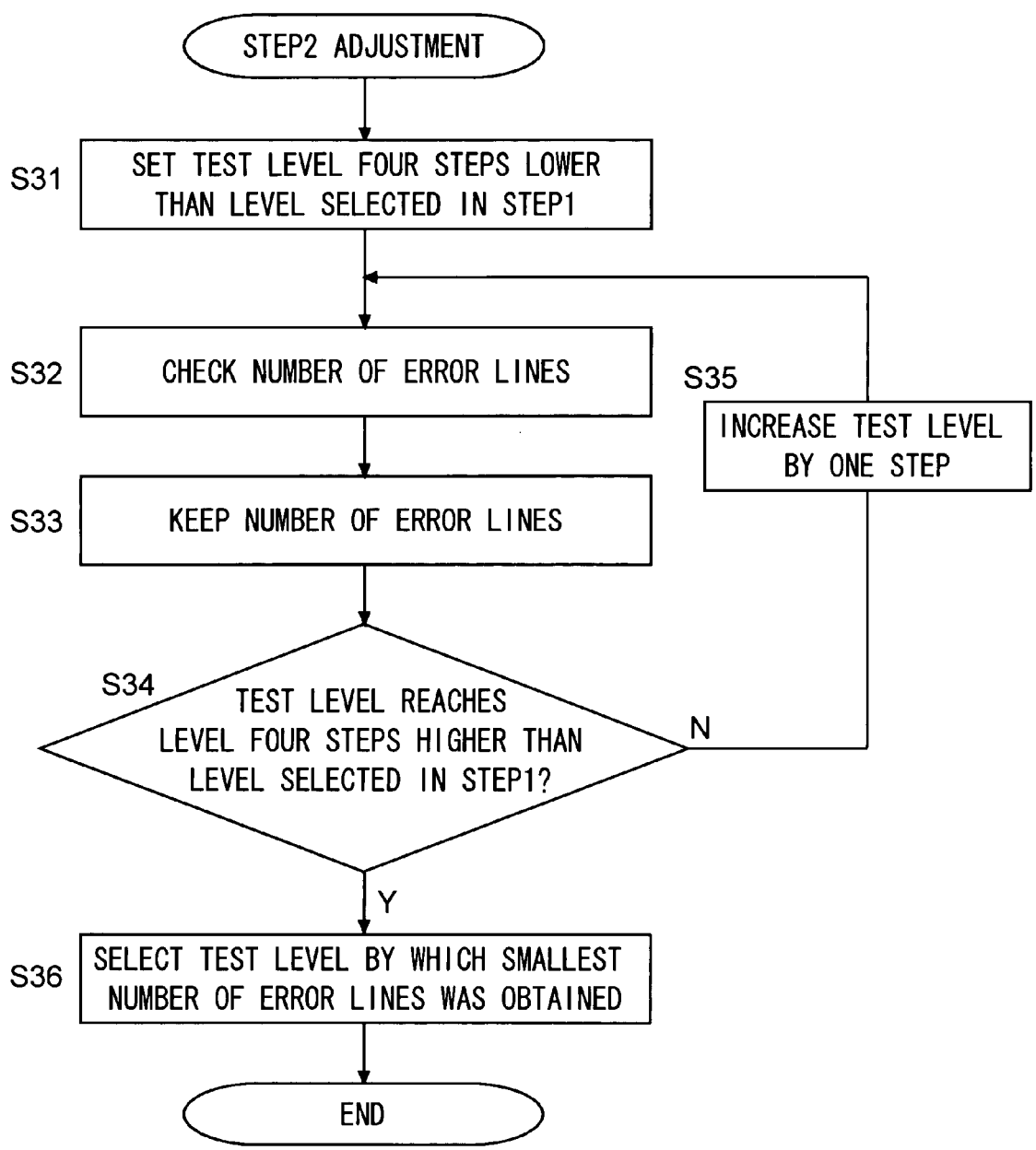
FIG. 4 is a flowchart concerning a process of STEP2 in the embodiment of the present invention.

Next, contents of the adjustment of the slice level that is performed in the present embodiment will be described in detail with reference to the flowcharts shown in FIGS. 2 to 4. First, a general flow of the process will be described with reference to FIG. 2. At this point, the phrases of "first adjustment", "second adjustment" and "first process" to "fourth process" shown in the left side of FIG. 2 correspond to terms used in the attached claims.

When the clock portion 6 measures the EPG transmission time, a maximum value and a minimum value in the amplitude direction of the EPG signal is detected first for the received one line (a period between horizontal synchronization signals). Then an level for checking the number of error lines (hereinafter referred to as a "test level") is set in which a average value of the maximum value and a minimum value in the amplitude has an appropriate range as a real slice level, and defines an upper threshold level (hereinafter referred to as "REF1") and a lower threshold level (hereinafter referred to as "REF2") as a set of two levels. In addition, this setting of the average value of the maximum value and the minimum value of the amplitude as the test level is hereinafter referred to as "automatic setting" as necessity. In addition, the start timing of the adjustment process of the slice level is not strictly limited to the timing when the clock portion 6 measures the EPG transmission time but can include a time difference within the scope without deviating from the spirit the present invention.

Figure 5:
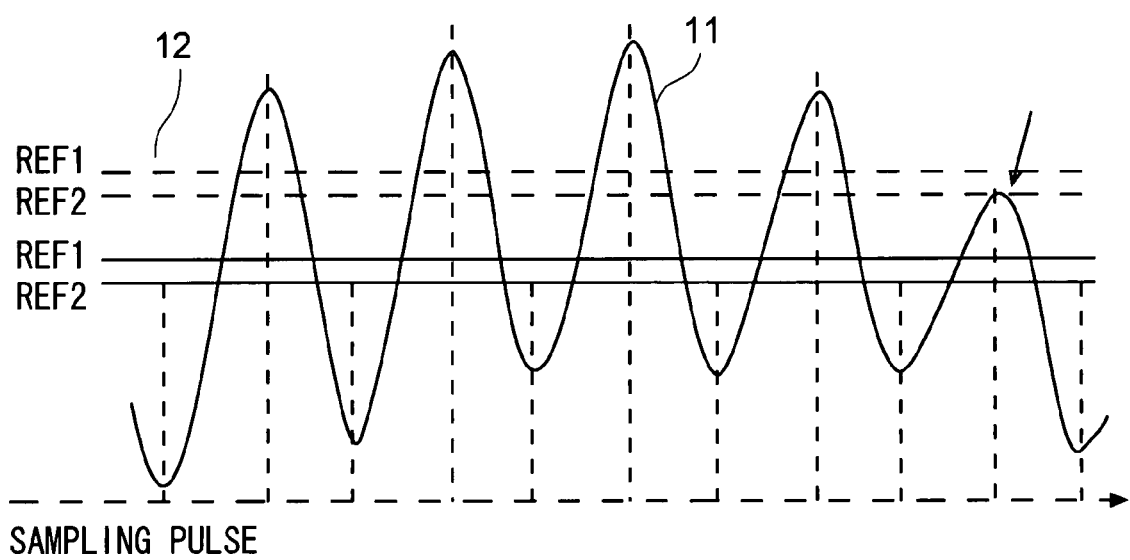
FIG. 5 is an explanatory diagram for describing contents of checking the number of error lines.

Next, using the test level set by the automatic setting, check of the number of error lines is performed (Step S1). At this point, the check of number of error lines is performed in synchronization with the sampling pulse by detecting whether or not a value of the EPG signal is more than REF1 if the EPG signal is convex upward, or by detecting whether or not a value of the EPG signal is less than REF2 if the EPG signal is convex downward. Then, if there is a point that does not satisfy this condition and is considered to be an error in one line, the line is counted as an error line. In a case shown in FIG. 5 for example, the test level indicated by the solid line does not cause an error. However, the test level indicated by the broken line causes the point indicated by the arrow, which is determined to be an error, so it is counted as the error line. It is because that the EPG signal value is less than REF1 despite that it is convex upward.

In addition, checks of the number of error lines in the period of 50 fields are performed as one set. Since the number of lines including the EPG signal is four per field, the number of checks for one set is 4×50=200. In the step S1, this check process is performed for three sets. At this point, one set of the check takes time of approximately 16 milliseconds (1 field time)×50=800 milliseconds.

Next, it is decided whether or not there are more than two sets in which the number of error lines is larger than 10 among 200 lines in the check result of three sets performed in the step S1 (Step S2). If there are more than two sets (Y in Step S2), it is considered that the current test level is not appropriate as the slice level. Therefore, the process of STEP1 (Step S3) and STEP2 (Step S4) are performed successively, and a level selected in the process of STEP2 is adopted as the slice level (Step S5).

On the contrary, if there are not more than two sets (N in Step S2), it is considered that the current test level is appropriate as the slice level. Therefore, the processes of STEP1 and STEP2 are not performed, and the test level obtained in the automatic setting is adopted as the slice level (Step S6). At this point, the process of STEP1 and STEP2 will be described later in detail.

After that, when it is detected via the clock portion that a predetermined readjustment standby time has passed from the start of the transmission of the EPG signal, the slice level that is currently set is used as the test level so that the check of the number of error lines for 50 fields is performed for three sets similarly to the process in the step S1 (Step S8). Then, it is decided whether or not there are more than two sets in which the number of error lines is larger than 10 in the check result of the step S8 (Step S9). At this point, the reason why the readjustment standby time is provided will be described later in detail.

As a result, if there are more than two sets (Y in Step S9), the process of STEP1 (Step S10) and STEP2 (Step S11) is performed, and the test level selected in STEP2 is adopted newly as the slice level (Step S12). On the contrary, if there are not more than two sets (N in Step S9), the processes of STEP1 and STEP2 are not performed, and the slice level that is already adopted is maintained as the slice level successively. After the process of the steps S1 to S12 described above, a series of the adjustment process of the slice level is completed. By the adjustment process described above, the slice level is adjusted to an appropriate value in accordance with a waveform of the EPG signal (in particular, a state of amplitude).

At this point, the adjustment of the slice level is performed again after the readjustment standby time has passed (Step S7) in the present embodiment described above. Therefore, even if a measurement error is generated in the clock portion, the adjustment of the slice level can be performed correctly. More specifically, because of a measurement error in the clock portion, coming of the time for the transmission of the EPG signal may be detected by mistake before the EPG signal is actually transmitted (before it comes to the reception side). In this case, the adjustment of the slice level is performed in a state without the EPG signal, so the adjustment may not be performed correctly. It is because that amplitude or the like at the position where the EPG signal should be to exist is different between the state of where the EPG signal is received and the state where the EPG signal is not received.

Figure 6:
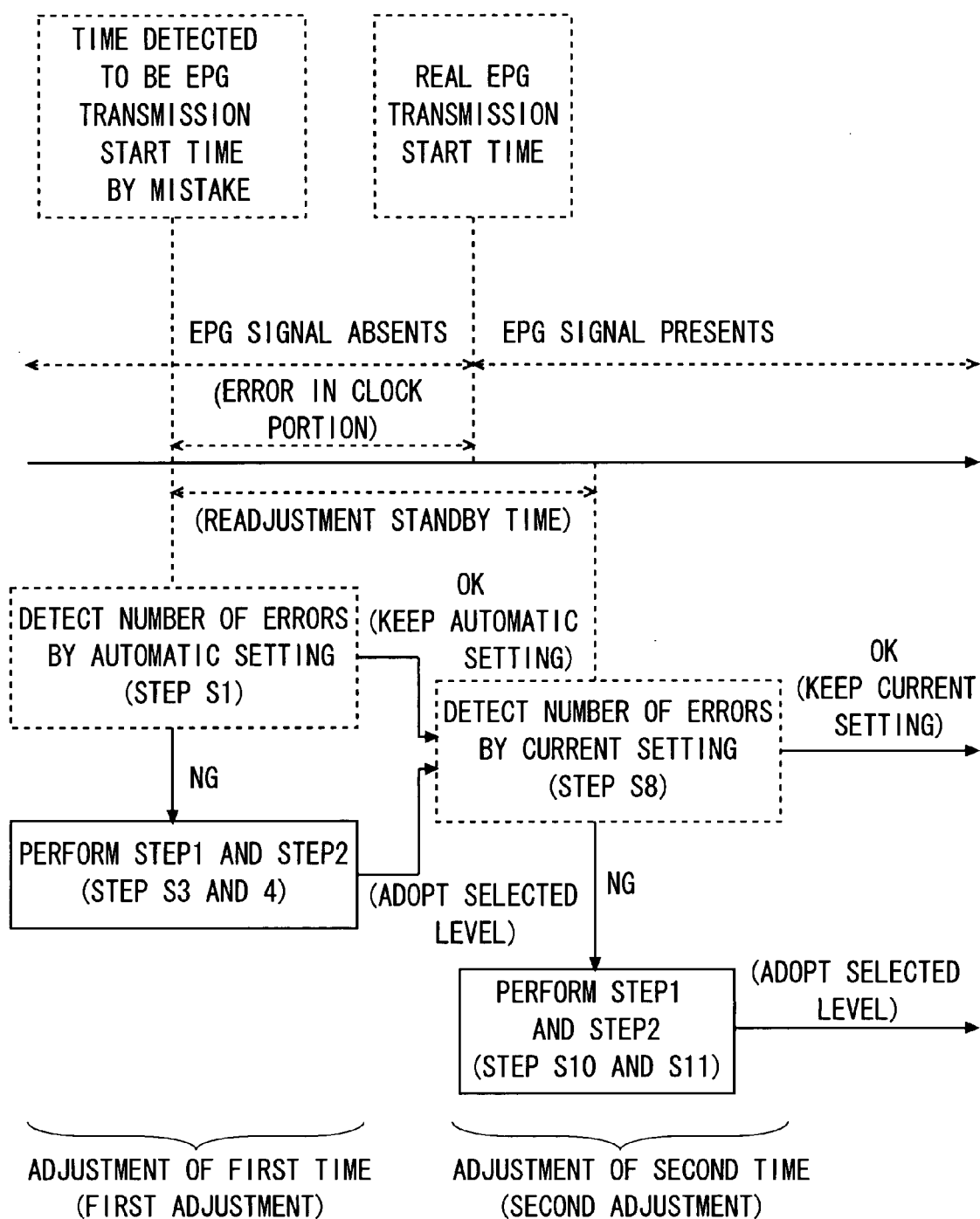
FIG. 6 is an explanatory diagram for describing contents of a readjustment standby time concerning the present invention.
Figure 8:
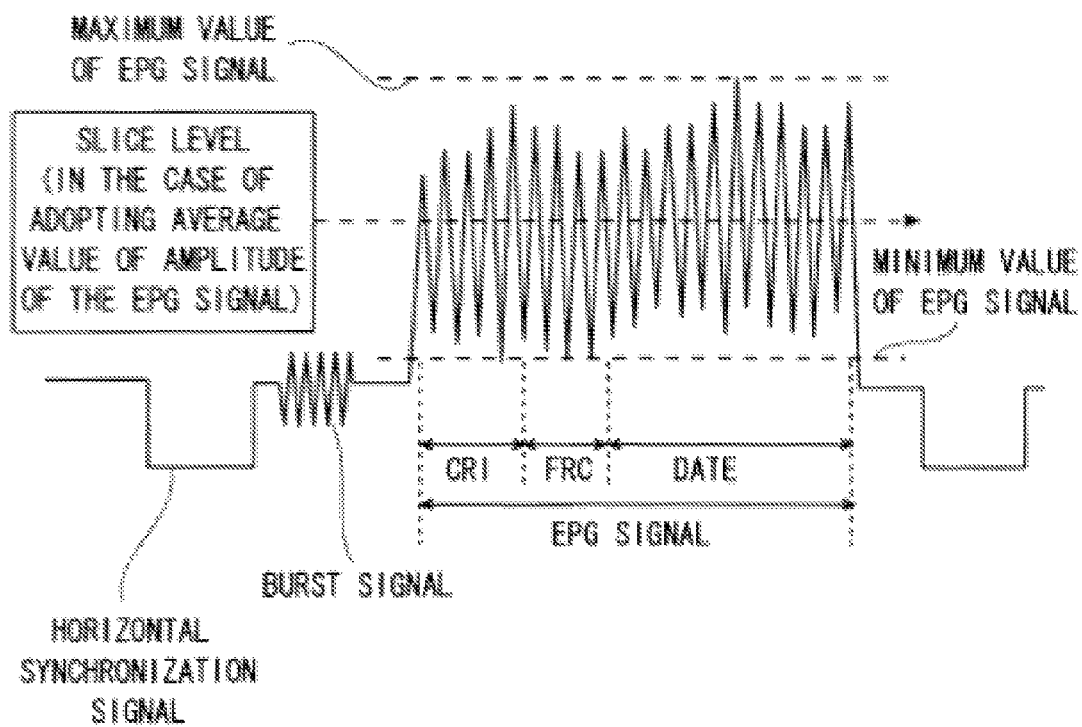
FIG. 8 is an explanatory diagram for describing contents of a TV signal that carries EPG data.

However, as shown in FIG. 6, even in a case where a measurement error is generated in the clock portion, the adjustment of the slice level is always performed in a state where the EPG signal is received if the readjustment standby time is set to a value larger than the measurement error. At this point, the readjustment standby time can be set to any value so that it becomes larger than an expectable measurement error. For example, if the clock portion can generates an error of ±60 seconds per month and if time adjustment is performed once a month, it is sufficient to expect 60 seconds as the measurement error and to set the readjustment standby time to two minutes or so.

In this way, the process from the step S1 to the step S6 (the first adjustment) enables the adjustment of the slice level quickly in response to coming of the EPG signal, while the process from the step S8 to the step S12 (the second adjustment) ensures the adjustment of the slice level in accordance with the current amplitude state of the EPG signal even if an error is generated in the clock portion 6.

In addition, it is possible to store information of a measurement error range (an error generated per time unit) of the clock portion in a memory portion and to provide an input portion for entering a frequency for performing adjustment of time in the clock portion, so that a product of the measurement error range and the frequency for performing adjustment of time is automatically set as the readjustment standby time. In this case, usability is further improved because a user only enters the frequency for performing adjustment of time.

Next, contents of the above-mentioned process of STEP1 will be described with reference to FIGS. 3 and 7. The process of STEP1 is aimed at selecting roughly an optimal level as the slice level from the range between a level predetermined as a lower limit of the slice level (hereinafter referred to as a "lower limit level 1") and a level predetermined as an upper limit of the slice level (hereinafter referred to as an "upper limit level 1") among all possible values.

First, the test levels (REF1 and REF2) are set to the lower limit level 1 (Step S21). Then, in this state, similarly to the case of the step S1, the check of the number of error lines is performed (Step S22), and the number of error lines at that time is saved in a register or the like (Step S23).

These processes of the step S22 and S23 are performed repeatedly until the test level reaches the upper limit level 1 (Step S24) while the test level is increased step by step (Step S25). At this point, the range between the lower limit level 1 and the upper limit level 1 is divided equally into thirteen levels, and the test level is increased one by one of these thirteen levels in the step S25. At this point, switching of test levels (switching of register values) and change of detection timing are performed upon field interrupt because accuracy will be deteriorated if they are performed in the middle of a field.

When the test level reaches the upper limit level 1 (Y in Step S24), a test level in which a smallest number of error lines was obtained is selected from the thirteen levels that were checked concerning the number of error lines (Step S26), and the adjustment process of STEP1 is finished. For example, if the number of error lines is detected in each test level from A to M as shown in the upper section of FIG. 7, the test level G is selected.

Next, contents of the process of STEP2 will be described with reference to FIGS. 4 and 7. The process of STEP2 is aimed at selecting finely an optimal level as the slice level from the range between a level one step below the level selected in STEP1 (hereinafter referred to as a "lower limit level 2") and a level one step above the selected level (hereinafter referred to as a "upper limit level 2") among the thirteen levels described above.

First, the test levels (REF1 and REF2) are set to the lower limit level 2 (Step S31). Then, in this state, similarly to the case of the step S1, the check of the number of error lines is performed (Step S32), and the number of error lines at that time is saved in a register or the like (Step S33).

The processes of the step S32 and S33 are performed repeatedly until the test level reaches the upper limit level 2 (Step S34) while the test level is increased step by step (Step S35). At this point, the range between the lower limit level 2 and the upper limit level 2 is divided equally into nine levels, and that the test level is increased one by one of these nine levels in the step S35.

When the test level reaches the upper limit level 2 (Y in Step S34), a test level in which a smallest number of error lines was obtained is selected from the nine levels that were checked concerning the number of error lines (Step S36), and the adjustment process of STEP2 is finished. For example, if the number of error lines is detected in each test level from F to H as shown in the lower section of FIG. 7, the test level one step lower than the level G is selected.

According to the series of processes of STEP1 and STEP2 described above, an optimal level as the slice level can be searched precisely and efficiently from the range between the lower limit level 1 and the upper limit level 1. More specifically, in this method, a level appropriate as the slice level is selected roughly in STEP1, and only the vicinity of the level is searched finely in STEP2 so that the slice level is selected again. Therefore, the process becomes simpler than the case where the desired level is searched finely and selected from the first. At this point, contents and the like of level division and error check in STEP1 or STEP2 are not limited to those described above as long as the purpose of the process can be achieved.

In addition, the reason why the number of error lines is checked by the automatic setting in the steps S1 and S2 (at the beginning of the first adjustment) is to improve efficiency of the process. If the EPG signal waveform has little distortion, an appropriate slice level can be searched by even a simple process like the automatic setting, so it is possible to realize a quick process with reduced load on the controller. Since the processes of STEP1 and STEP2 are performed only in a case where an appropriate slice level cannot be searched by the automatic setting due to a large distortion in the EPG signal waveform or the like, it is possible to realize the process of adjusting an appropriate slice level considering a balance between process load and process accuracy.

In addition, the reason why the number of error lines is checked in the setting state of the first adjustment in the steps S8 and S9 (at the beginning of the second adjustment) is also to improve efficiency of the process. If the first adjustment is performed appropriately, it is usually considered that the slice level is already adjusted appropriately, so it is sufficient to maintain the setting state successively. Since the processes of STEP1 and STEP2 are performed only in a case where the setting state in the first adjustment is not appropriate as the slice level because the first adjustment is not performed appropriately due to an error in the clock portion 6 or the like, it is possible to realize the process of adjusting an appropriate slice level considering a balance between process load and process accuracy.

Furthermore, the present invention is not limited to the embodiment described above, which can be modified variously without deviating from the spirit and the scope of the present invention. For example, it is possible to provide other processing steps instead of the process of STEP1 and STEP2. In addition, although the EPG signal is exemplified as the received signal in the embodiment described above, the received signal can be any other type of signal as long as it is a signal whose transmission starts at a predetermined time.

What is claimed is:

1. A slice level adjustment unit for performing adjustment of a slice level with respect to a signal whose transmission is started at a predetermined time, in accordance with a waveform of the signal, wherein the unit includes a clock portion for measuring the current time, and the unit performs a first adjustment of the slice level when the clock portion measures substantially the predetermined time and performs a second adjustment when the clock portion measures a readjustment standby time past the predetermined time.

2. The slice level adjustment unit according to claim 1, wherein the first adjustment and/or the second adjustment include a first process for selecting an optimal level as the slice level from a group of first levels that are obtained by dividing a range between an upper limit level predetermined as an upper limit of the slice level and a lower limit level predetermined as a lower limit by a predetermined number, and a second process for selecting an optimal level as the slice level from a group of second levels that are obtained by further dividing a range between levels neighboring the selected level by the first process among the group of first levels by a predetermined number.

3. The slice level adjustment unit according to claim 2, wherein the first adjustment includes a third process for detecting a maximum value and a minimum value of the signal during a predetermined period, and for deciding whether or not an average value of them is allowable to be the slice level.

4. The slice level adjustment unit according to claim 2, wherein the second adjustment includes a fourth process for deciding whether or not the slice level adopted in the first adjustment is allowable to be the slice level.

5. The slice level adjustment unit according to claim 1, wherein the first adjustment includes a third process for detecting a maximum value and a minimum value of the signal during a predetermined period, and for deciding whether or not an average value of them is allowable to be the slice level.

6. The slice level adjustment unit according to claim 5, wherein the second adjustment includes a fourth process for deciding whether or not the slice level adopted in the first adjustment is allowable to be the slice level.

7. The slice level adjustment unit according to claim 1, wherein the second adjustment includes a fourth process for deciding whether or not the slice level adopted in the first adjustment is allowable to be the slice level.

8. An EPG data obtaining device comprising:
a slice level adjustment unit according to claim 1 for performing adjustment of a slice level with respect to an EPG signal; and
a data obtaining portion for obtaining EPG data from the EPG signal based on the slice level obtained by the slice level adjustment unit.

9. A slice level adjustment unit for performing adjustment of a slice level with respect to an EPG signal whose transmission is started at a predetermined time, in accordance with a waveform of the signal, wherein
the unit includes a clock portion for measuring the current time,
the unit performs a first adjustment of the slice level when the clock portion measures substantially the predetermined time and performs a second adjustment when the clock portion measures a readjustment standby time past the predetermined time,
in the first adjustment,
a third process is performed for detecting a maximum value and a minimum value of the signal during a predetermined period, and for deciding whether or not an average value of them is allowable to be the slice level,
if it is decided that the average value is allowable to be the slice level in the third process,
the average value is adopted as the slice level,
if it is decided that the average value is not allowable to be the slice level in the third process,
a first process for selecting an optimal level as the slice level from a group of first levels that are obtained by dividing a range between an upper limit level predetermined as an upper limit of the slice level and a lower limit level predetermined as a lower limit by a predetermined number, and
a second process for selecting an optimal level as the slice level from a group of second levels that are obtained by further dividing a range between levels neighboring the selected level by the first process among the group of first levels by a predetermined number are performed so that the level selected in the second process is adopted as the slice level,
in the second adjustment,
a fourth process for deciding whether or not the slice level adopted in the first adjustment is allowable to be the slice level is performed,
if it is decided that the slice level adopted in the first adjustment is allowable to be the slice level in the fourth process,
the slice level adopted in the first adjustment is maintained as the slice level successively, and
if it is decided that the slice level adopted in the first adjustment is not allowable to be the slice level in the fourth process,
the first process and the second process are performed so that the level selected in the second process is adopted as the slice level.

* * * * *